US009653730B2

(12) United States Patent
Pitteloud (10) Patent No.: US 9,653,730 B2
(45) Date of Patent: May 16, 2017

(54) NON-AQUEOUS SECONDARY BATTERY HAVING A BLENDED CATHODE ACTIVE MATERIAL

(71) Applicant: Belenos Clean Power Holding AG, Bienne (CH)

(72) Inventor: Cedric Pitteloud, Saint-Louis (FR)

(73) Assignee: Belenos Clean Power Holding AG, Bienne (CH)

( * ) Notice: Subject to any disclaimer, the term of this patent is extended or adjusted under 35 U.S.C. 154(b) by 178 days.

(21) Appl. No.: 13/765,193

(22) Filed: Feb. 12, 2013

(65) Prior Publication Data

US 2013/0216903 A1 Aug. 22, 2013

(30) Foreign Application Priority Data

Feb. 17, 2012 (EP) .................................... 12155894

(51) Int. Cl.

| H01M 4/36 | (2006.01) |
|---|---|
| H01M 4/48 | (2010.01) |
| H01M 4/485 | (2010.01) |
| H01M 4/58 | (2010.01) |
| H01M 4/131 | (2010.01) |
| C01G 31/00 | (2006.01) |

(52) U.S. Cl.
CPC ............ *H01M 4/485* (2013.01); *C01G 31/00* (2013.01); *H01M 4/131* (2013.01); *H01M 4/364* (2013.01); *H01M 4/5825* (2013.01); *C01P 2004/62* (2013.01); *Y02P 70/54* (2015.11)

(58) Field of Classification Search
CPC ...... H01M 4/485; H01M 4/505; H01M 4/525; H01M 4/661; H01M 4/019; H01M 4/8652
See application file for complete search history.

(56) References Cited

U.S. PATENT DOCUMENTS

| 3,981,748 | A | 9/1976 | Margalit |
| 7,041,239 | B2 | 5/2006 | Barker et al. |
| 7,811,707 | B2 | 10/2010 | Lampe-Onnerud et al. |
| 7,811,708 | B2 | 10/2010 | Lampe-Onnerud et al. |
| 2001/0016284 | A1* | 8/2001 | Kweon et al. ............... 429/224 |
| 2004/0029011 | A1 | 2/2004 | Ravet et al. |
| 2007/0072081 | A1 | 3/2007 | Kitao et al. |

(Continued)

OTHER PUBLICATIONS

Legagneur et al., "New layered vanadium oxides MyH1-yV3O5 (M=Li, Na, K) obtained by oxidation of the precursor H2 V3O8", J. Mater. Chem., 2000, 10, 2805-2810.*

(Continued)

*Primary Examiner* — Kenneth Douyette
(74) *Attorney, Agent, or Firm* — Sughrue Mion, PLLC (57) ABSTRACT

An electrochemically active material comprising a mixture or blend of two groups of particles, exhibits synergetic effect. The two groups of particles are compounds of formula $Li_xH_yV_3O_8$ and compounds of formula $Li_xM_yPO_4$ wherein M is one or more transition metals, comprising at least one metal which is capable of undergoing oxidation to a higher valence state. In order to obtain a synergistic effect, the particles of formula (I) and the particles of formule (II) are present in amounts of 5:95% by weight to 95:5% by weight.

20 Claims, 3 Drawing Sheets (56) References Cited

U.S. PATENT DOCUMENTS

2009/0081529 A1 3/2009 Thackeray et al.
2009/0297947 A1* 12/2009 Deng et al. ................ 429/218.1

OTHER PUBLICATIONS

"From Amorphous to Crystalline via Vitreous Cathode Materials for Rechargeable Lithium Ion-Batteries", Florian Leonardt Wachter, Dissertaion, Rheinische-Friedrich-Wilhelm-Universität Bonn, 2012, title page-p. 160.*
Natasha A. Chernova et al., "Layered vanadium and molybdenum oxides: batteries and electrochromics", Journal of Materials Chemistry, 2009, pp. 2526-2552, vol. 19, No. 17.
M. Stanley Whittingham et al., "Some transition metal (oxy)phosphates and vanadium oxides for lithium batteries", Journal of Materials Chemistry, 2005, pp. 3362-3379, vol. 15, No. 33.
European Search Report for EP 12 15 5894 dated Jun. 26, 2012.

* cited by examiner

NON-AQUEOUS SECONDARY BATTERY HAVING A BLENDED CATHODE ACTIVE MATERIAL

This application claims priority from European Patent Application No. 12155894.4 filed 17 Feb. 2012, the entire disclosure of which is incorporated herein by reference.

TECHNICAL FIELD

This invention relates to an electronically or electrochemically active material (EAM), a cathode comprising same, and a rechargeable battery comprising such cathode.

BACKGROUND ART

Lithium ion batteries are one of the most popular types of rechargeable batteries with one of the best energy-to-weight ratios, no memory effect, and a slow loss of charge when not in use. Lithium-ion batteries are growing in popularity for many applications due to their high energy density. Such applications comprise cellular phones, notebook computers, and vehicles like electro-bicycles and cars.

The three primary functional components of a lithium ion battery are an anode (the negative electrode during discharge) that contains a material that is oxidized during discharge of the battery; a cathode that contains a material that is reduced during discharge of the battery; and an electrolyte that provides for transfer of ions between the cathode and anode. For all three functional components a variety of materials may be used.

One type of lithium batteries uses "insertion" cathodes and anodes. Such batteries are referred to as "lithium ion" batteries. Both the anode and cathode are materials into which and from which lithium can migrate. The process of lithium moving into the anode or cathode is generally referred to as intercalation, and the reverse process, in which lithium moves out of the anode or cathode may be termed deintercalation. When a cell is discharging the lithium is extracted from the anode and inserted into the cathode. When the cell is charging, the reverse process occurs, i.e. lithium is extracted from the cathode and inserted into the anode. Therefore, insertion or "intercalation" electrodes contain materials having a lattice structure into which an ion can be inserted and subsequently extracted. Rather than chemically altering the intercalation material, the ions slightly expand the internal lattice lengths of the compound without extensive bond breakage or atomic reorganization.

Insertion anodes of conventional commercial lithium-ion cells are made from carbon, or rather graphite although other anode materials are also known, e.g. lithium chalcogenides like lithium oxide, and/or investigated.

A variety of materials have been suggested for use as cathode active materials in intercalation cathodes of lithium ion batteries suitable for multiple intercalation and deintercalation cycles. Such materials include, for example, $MoS_2$, $MnO_2$, $TiS_2$, $NbSe_3$, $LiCoO_2$, $LiNiO_2$, $LiMn_2O_4$, $V_6O_{13}$, $V_2O_6$, $CuCl_2$, transition metal oxides, such as those of the general formula $Li_xM_2O_y$, are among those materials preferred in such batteries having intercalation electrodes. Other materials include lithium transition metal phosphates, such as $LiFePO_4$, and $Li_3V_2(PO_4)_3$.

During charging, lithium from the cathode is transferred to the anode where it intercalates while during discharging the lithium is transferred from the anode to the cathode where it intercalates. This back-and-forth transport of lithium ions ($Li^+$) between the anode and cathode during charge and discharge cycles has led to these cells as being called "rocking chair" batteries.

The third functional component, the electrolyte, is a lithium salt in an organic, typically aprotic and water-free solvent.

Depending on the choice of material for the anode, cathode, and electrolyte the voltage, capacity, lifetime, and safety of a lithium ion battery can change dramatically.

Useful work can only be extracted if not only lithium ions are moved but also electrons flow through an external circuit. Therefore the ease of electron removal and receipt are relevant.

Recently several new and/or improved electrode materials have been developed, some of them being based on electronically active nanoparticles in combination with a conductively filled binder and/or with an electrically conducting binder, for weight reduction also in form of nanoparticles. Patent applications on such materials are e.g. EP 2 228 854 A1 and EP 2 287 946 A1.

It is also already known to combine more than one electrochemically active material (EAM) for producing an electrode, e.g. a cathode. Such combination materials are described in e.g. U.S. Pat. No. 3,981,748, U.S. Pat. No. 7,811,707, and U.S. Pat. No. 7,811,708.

U.S. Pat. No. 3,981,748 discloses combinations of silver phosphate ($Ag_3PO_4$) and silver chromate ($Ag_2CrO_4$) and lithium phosphate ($Li_3PO_4$) and silver chromate as cathode materials in lithium batteries. The combination with silver chromate is made for reducing the expansion found for pure silver phosphate resulting in a different voltage.

U.S. Pat. No. 7,811,707 and U.S. Pat. No. 7,811,708 of the same applicant are closely related and deal with the problem of enhancing the battery safety. As solution they propose compositions comprising at least one of a lithium cobaltate and a lithium nickelate; and at least one of a manganate spinel and an olivine compound.

U.S. Pat. No. 7,041,239 B2 discloses binary or ternary blends intended for improving electrode characteristics such as cycling capacity, capacity retention, operating temperature characteristics and voltage profiles. The materials are an olivine type material, an alkali metal transition metal oxide with the transition metal being different from Mn and a n alkali metal manganium oxide.

In general, a desirable cathode material must exhibit a high free energy of reaction with lithium, be able to intercalate a large quantity of lithium, maintain its lattice structure upon intercalation and deintercalation of lithium, allow rapid diffusion of lithium, afford good electrical conductivity, not be significantly soluble in the electrolyte system of the battery. Preferably such material can readily and economically be produced.

Many of the cathode materials known in the art lack one or more of these characteristics. As a result, for example, many such materials are not economical to produce, afford insufficient voltage, have insufficient charge capacity, or lose their ability to be recharged over multiple cycles.

Therefore, there is still a need for better materials with e.g. higher capacity and/or more recharging cycles.

DISCLOSURE OF THE INVENTION

Hence, it is a general object of the invention to provide an improved electrochemically active material (EAM) for cathodes.

Now, in order to implement these and still further objects of the invention, which will become more readily apparent as the description proceeds, the electrochemically active material is manifested by the features that it comprises a mixture or blend of two groups of particles, said groups having differing chemical compositions and being selected from (a) at least one kind of particles of compounds of formula (I)

$$Li_xH_yV_3O_8 \quad (I),$$

wherein
x+y is 0 to 6.5,
x is 0 to 4.5, preferably 0.1 to 2.0, more preferably 0.5 to 1.8 and
y is 0.01 to 2, preferably 0.1 to 1.9;
and (b) at least one kind of particles of compounds of formula (II)

$$Li_xM_yPO_4 \quad (II),$$

wherein
x is >0 to 8, preferably >0 to 2, more preferably >0 to 1;
M is one or more transition metals comprising at least one metal capable of undergoing oxidation to a higher valence state, in particular at least one transition metal selected from the group consisting of Ti, V, Cr, Mn, Fe, Co, Ni, Co, Zr, Nb, Mo, Ru, Rh, and Pd, preferably Fe, Co, Ni, V, Zr, Ti, Mo and Cr, especially transition metals in oxidation state 2 or 3;
y is 0.8 to 3, preferably 0.8 to 1.2, more preferably y is 1;
$PO_4$ is a trivalent anion;
and
said particles of formula (I) and said particles of formula (II) are present in amounts of 5:95% by weight to 95:5% by weight.

Thus, the present invention provides mixtures or "blends" of electrochemically active materials (also referred to as electrode active materials). The terms mixtures or blends mean that they comprise at least two groups of particles of EAM having different chemical compositions, i.e. particles of two groups of chemical compounds, namely compounds of formula (I) and compounds of formula (II).

It has surprisingly be found that such compositions exhibit a positive synergistic, i.e. capacity enhancing effect allowing the production of batteries with higher energy density.

In a preferred compound of formula (I) x ranges from 0.1 to 2, preferably from 0.5 to 1.8 and y ranges from 0.1 to 1.9, preferably from 0.3 to 1.5 and x+y is at least two, i.e. may exceed and preferably exceeds 2.

Compounds of formula (II) preferably crystallize in the orthorhombic crystal system.

In particular if one of the materials is electronically non or only poorly conducting, the two compounds are used in form of nanoparticles, much preferred in form of nanoparticles having a particle size in the range of <500 nm.

By mixing the two EAM, a synergetic effect on the capacity may be achieved. This effect may be assessed as follows:

The capacity of sample A is measured giving a value $C_A$ and the capacity of sample B is measured giving a value $C_B$. If no synergetic effect is present when mixing both materials, the blend capacity is percentage of A multiplied by $C_A$ plus percentage of B multiplied by $C_B$ or $$xA^*C_A+(1-x)B^*C_B \quad (III)$$

where x represent the amount of compound A in the mixture of A+B being 1.

If a synergetic effect is present, the mixture can show higher or lower capacity than the theoretical capacity calculated according to the formula (III) above.

For a blend of $A=Li_xH_yV_3O_8$ and B=other a preferred composition range was found to be A=5 to 50% by weight and B=95 to 50% by weight, preferably A=10 to 40% by weight and B=90 to 60% by weight.

The best effect for a blend of $Li_xH_yV_3O_8$ and $LiFePO_4$ was found for a composition of about 25% by weight $Li_xH_yV_3O_8$ and 75% by weight $LiFePO_4$.

An electrode can be prepared by coating an electrode collector with the blend. In order to ensure the conductivity, the EAM is preferably conductively coated and fixed on the support using a matrix, said matrix either comprising a non-conducting binder that is conductively filled, e.g. with a carbonaceous material like graphite powder, carbon black, acetylene black, fibrous carbon material, etc. or comprising a conductive binder that may optionally also comprise and preferably also comprise conductive fillers. The amount of filler in the final electrode typically is less than 20% by weight referred to the collector coating.

Suitable binders may be selected from the group comprising PVDF (polyvinylidene fluoride), PTFE (polytetrafluoroethylene), tetrafluoroethylene, propylene hexafluoride vinylidene fluoride copolymer, polyolefin resin, carboxymethylcellulose, hydrosypropylmethyl cellulose, polyvinylalcohol, hydroxypropyl cellulose, diacetyl cellulose, stryrenebutadiene rubber, acrylonitrile-butadiene rubber, acrylonitrile-butadiene-styrene rubber, polyacrylic acid, poly(3,4-ethylenedioxythiophen (PEDOT) and blends of two or more thereof. These binders can be used as film or in form of nanoparticles, preferably nanoparticles in a range of <500 nm.

A preferred electrically conducting binder is poly(3,4-ethylenedioxythiophen (PEDOT). Such matrix and the preparation of electrodes is described in EP 2 228 855 the disclosure of which is incorporated herein in its entirety.

In a specific embodiment, the electrically conductive binder nanoparticles are present in an amount of 1 to 10% by weight, preferably 1 to 5% by weight based on the weight of the blend composition.

In order to impart conductivity to, or to improve the conductivity of, the EAM (or non conductive binder) nanoparticles, they can advantageously be coated with a conductive layer, in particular with a carbon/graphite/graphene layer.

Carbon coating of nanoparticulate EAM may be performed by carbon deposition via pyrolysis of various organic precursors such as e.g. sugars or ketones.

Such cathode may be used together with an anode and an electrolyte to manufacture a rechargeable battery.

A suitable anode or at least the EAM of a current collector coating may be selected from carbon material, such as natural or artificial graphite, coks, carbon black, pyrolitic carbon, carbon fibers, organic polymer baked compound, etc., or it can be an oxide such as $SiO_2$, SiO and $SiO_x$, $TiO_2$, TiO and $TiO_x$, $Fe_2O_3$, $Fe_3O_4$, $FeO_x$, $SnO_2$, SnO, $SnO_x$, $WO_3$, $WO_2$, $WO_x$, $Li_4Ti_5O_{12}$, $LiVO_2$ (such as $Li1.1V0.9O_2$), $Ti_2S_3$, $TiS_2$, TiS, $TiS_x$, $V_3S_4$, $VS_2$, VS, $VS_x$, $Fe_3S_4$, $FeS_2$, $FeS_x$, $Mo_2S_3$, $MoS_2$, $MoS_x$, $SnS_2$, SnS, $SnS_x$, $Sb_2S_3$, $SbS_x$, $Se_5S_3$, $SeS_2$, SeS, $SeS_x$, $Li_3N$, $Li_3$-$xA_xN$ (where A is nickel or cobalt and 0<x<3). Metallic anodes comprising Al, Si, Sn, Ag, Bi, Mg, Zn, In Ge, Pb, Pd, Pt or Ti which can be alloyed with lithium. Much preferred are carbonaceous materials like graphite, carbon black, pyrolitic carbon and carbon fibers.

The anodic EAM may be bound to a current collector as described above for the cathodes and the particles may be conductively coated as also already described above.

The electrolyte needed as third component of a battery is preferably a material that exhibits high ionic conductivity, as well as having insulating properties to prevent self-discharging during storage. The electrolyte can be either a liquid or a solid. A liquid electrolyte comprises a solvent and an alkali metal salt that together form an ionically conducting liquid. So called "solid electrolytes" (typically polymeric matrixes) contain an ionic conductive medium (typically a lithium containing salt dissolved in organic solvents) in combination with a polymer that itself may be ionically conductive but electrically insulating.

Typical salts for use in an electrolyte are one or more lithium salts like $LiClO_4$, $LiPF_6$, $LiAsF_6$, $LiSbF_6$, $LIBF_4$, $LiB(C_6H_5)_4$, $LiBr$, $LiCF_3SO_3$, $LiN(SO_2CF_3)_2$, $LiN(SO_2C_2F_5)_2$, $LiC(SO_2CF_3)_3$, $Li_2B_{10}Cl_{10}$, low-grade aliphatic carboxylic acid lithium salts, $LiAlCl_4$, and mixtures thereof. Presently preferred are $LiPF_6$, $LiAsF_6$, $LiSbF_6$, $LiBF_4$, $LiCF_3SO_3$, $LiN(SO_2CF_3)_2$, and $LiC(SO_2CF_3)_3$.

The salt content is preferably from about 5% to about 65%, preferably from about 8% to about 35% (by weight of electrolyte). An exemplary electrolyte comprises $LiBF_4$ in a molar concentration of from 0.5M to 3M, preferably 1.0M to 2.0M, and most preferably about 1.5M.

The solvent is preferably a low molecular weight organic solvent added to the electrolyte, which may serve the purpose of solvating the inorganic ion salt. The solvent is preferably a compatible, relatively non-volatile, aprotic, polar solvent. Examples of solvents among those useful herein include unsubstituted and C1-C6 alkyl substituted chain carbonates such as dimethyl carbonate (DMC), diethyl carbonate (DEC), dipropylcarbonate (DPC), and ethyl methyl carbonate (EMC); unsubstituted and C1-C6 alkyl substituted cyclic carbonates such as ethylene carbonate (EC), propylene carbonate (PC) and butylene carbonate; ethers such as diglyme, triglyme, and tetraglyme; lactones; esters, like unsubstituted and C1-C6 substituted 4-membered 6-propiolactone (or simply propiolactone); γ-butyrolactone (5-membered ring), δ-valerolactone (6-membered ring) and ε-caprolactone (7-membered ring). Examples of pairs of solvents include EC/DMC, EC/DEC, EC/DPC and EC/EMC and combinations of carbonates and esters.

One embodiment of a solid polymeric electrolyte, is made up of a solid polymeric matrix and a salt homogeneously dispersed via a solvent in the matrix. Suitable solid polymeric matrices include those well known in the art and include solid matrices formed from organic polymers, inorganic polymers or a solid matrix-forming monomer and from partial polymers of a solid matrix forming monomer.

In a variation, the polymer, solvent and salt together form a gel which maintains the electrodes spaced apart and provides the ionic conductivity between electrodes. In still another variation, the separation between electrodes is provided by a glass fiber mat or other matrix material and the solvent and salt penetrate voids in the matrix.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

The invention is now further described by means of $LiFePO_4$ and—as comparative example—$LiCoO_2$.

In order to investigate a possible synergism, several blends were prepared by mixing $Li_xH_yV_3O_8$ as first compound (below referred to as compound or material A) with $LiFePO_4$ or $LiCoO_2$ as second compound (below referred to as compound or material B).

This was done by mixing 75% A with 25% B, 50% A with 50% B and 25% A with 75% B (all % are % by weight). Also measured were the pure compounds A and B.

It was found that the best compositions of $A=Li_xH_yV_3O_8$ and $B=LiFePO_4$ are A=5 to 50% by weight and B=95 to 50% by weight, preferably A=10 to 40% by weight and B=90 to 60% by weight.

It was also surprisingly found that oxygen comprising polyanions are favourable while oxide type material even has a negative synergetic effect. Without wanting to be bound by theory, the inventor assumes that the positive synergetic effect might probably be due to a favourable interaction between the phosphate (or other polyanion) groups and the vanadium oxide surface.

The highest synergism was found for a composition of about 25% by weight $Li_xH_yV_3O_8$+75% by weight $LiFePO_4$.

EXPERIMENTAL PART

Materials and Methods $Li_xH_yV_3O_8$ from different lots was obtained from Prof. Nesper's group, ETHZ Zurich. The preparation of that material is described in Example 1.

In all experiments the Li content was kept constant, namely x=1.7 and y=0.6, i.e. $Li_{1.7}H_{0.6}V_3O_8$.

LiCoO2 was bought from Aldrich

LiFePO4 was obtained as sample from HydroQuebec and from Aleees

CMC, carboxymethylcellulose was obtained from PC Kelco (brand name CEKOL®4000)

Stryrene butadiene binder was obtained from LICO (code name LHB-108P)

Graphite and acetylene black were obtained from Timcal (brand name Timrex®KS6 and Super P Li® respectively)

All the samples were prepared in a similar manner by varying the percentage of the different active materials.

The electrochemical tests were done on a Maccor battery & cell test bench. The electrochemical properties were measured against a metallic lithium anode with an usual electrolyte composed by 1:1 EC:DMC (ethyl carbonate and dimethyl carbonate) with a dissolved 1M $LiPF_6$ salts. The voltage range was set from 1.6 to 4.1V with a constant current of 100 mA/g.

Example 1

Preparation of $Li_xH_yV_3O_8$

Example 1a

Synthesis of $H_2V_3O_8$ (First Method)
200 ml of a 0.06 M aqueous solution of vanadium (IV), such as vanadyl chloride pentahydrate, and 200 ml of distilled water were put in a 800 ml Teflon® inlet. The inlet was then transferred to a steel autoclave and placed in an oven which was previously preheated to 220° C. A magnetic stirrer (80 rpm) warranted the homogeneity of the solution. The temperature was kept constant for 12 hours. After removal of the autoclave out of the oven and cooling under ambient conditions, the green solid product was filtered, washed 2 times with distilled water and one times with isopropanol and dried in air at 120° C. for 3 hours. 450 to 550 mg substance were obtained this way.

A vanadyl chloride solution suitable for being used as starting material in the above reaction was prepared by quantitative precipitation of the sulfate out of a vanadyl sulfate solution with barium chloride. After filtration with microsize filter (0.22 µm pore diameter) a clear vanadyl chloride solution was obtained.

The oxidative route of the present invention is safe and fast. Preferably vanadium (IV) is used in excess in the reaction mixture such that some vanadium (IV) remains in the mixture at the end of the synthesis. The vanadyl solution is acidic (pH≤3). Hydrothermal treatment was performed during 12 h at 220° C. (temperature measured at the outside of the reaction vessel or 180° C. if the temperature is measured within the reaction mixture). The 12 h at 220° C. are a minimum. No more than half of the reaction vessel should be filled. In order to prevent aggregation, the product may be washed with a non-coordinating solvent.

(Second Method)
3 g $VOSO_4.5H_2O$ were dissolved in 50 ml deionized water. 2 ml of 25% by weight ammonia ($NH_4OH$) were then added. The dense precipitate which forms immediately is filtered and the grey wet solid product collected, put in a Teflon® vessel of an autoclave and dispersed in 400 ml distilled water. After addition of 1 ml 12 M HCl, the autoclave was sealed and the suspension treated hydrothermally for 48 hours at 220° C. At the end of the reaction, the green solid product was filtered, washed with water and isopropanol and dried at 100° C. in air overnight. 750 mg $H_2V_3O_8$ were obtained. The vanadium yield equaled 70%.

Example 1b

Synthesis of $Li_{1.7}H_{0.6}V_3O_8$; Self-assembly, Lithiation and Carbonization 0.68 mg (0.0071 mmol) lithium lactate, 0.8 mg (0.0049 mmol) vanadyl sulfate and 0.3 mg (0.0125 mmol) lithium hydroxide were dissolved in 0.5 ml distilled water in a 10 ml tightly closeable test tube. 1.5 ml graphene oxide (GO) solution (prepared as described in Example 1.4) was then added and the test tube was gently shaken in order to obtain a bright brownish clear solution. 20 mg (0.0707 mmol) $H_2V_3O_8$ were dispersed in the solution, the test tube sealed and the resulting suspension homogenized through ultrasound and vigorous shaking. Once homogenization was completed, the test tube containing a green suspension was put in an oven and kept at 150° C. for 1.5 h. During this hydrothermal step, the pressure inside the vessel increased to approx. 3-4 bar while lithiation, self-assembly and thermolysis of GO to graphene took place. The suspension changed into a black liquid with a dense (dark blue) solid floating in it. At the end of the hydrothermal treatment, this dark blue solid, being the EAM, was collected for being mixed with compound of formula (II).

Example 1.3

Preparation of Graphite Oxide 10 g graphite were thoroughly mixed with 85 g sodium perchlorate powder. The mixture was cooled to approx. −20° C. using an ice sodium chloride mixture and then slowly stirred with an efficient stirrer. Then 60 ml fuming nitric acid were very slowly added. The viscous green mass was stirred for an additional 30 minutes at room temperature. The mixture was left over night without agitation and then slowly heated to 60° C. for 10 hours. Then 2 liters of water were added to the reaction product, the mixture was filtered and once washed with diluted hydrochloric acid and at least twice, each time with 2 liters of water. After filtration, the obtained mass was freeze dried yielding about 14 g of graphite oxide as a very fluffy ivory colored powder.

Based on the elemental analysis of the graphite oxide the chemical formula $C_8O_4H_{17}$ results. After subtraction of hydrogen as water the formula $C_8O_{3.2}$ is obtained with a C/O ratio of 2.5. Using X-ray diffraction analysis it could be shown that the inter-planar distance of 3.35 Å in graphite was enlarged to 6.1 Å in dry graphite oxide.

Example 1.4

Preparation of a Colloidal Graphene Oxide Dispersion (Also Referred to as GO Solution)

100 mg of the graphite oxide obtained as described in Example 1.3 were added to 100 ml of deionized water, thoroughly stirred for 12 hours and then left in an ultrasonic bath for 1 hour. The such obtained colloidal dispersion of graphite oxide (further on referred to as graphene oxide), was then reacted to colloidal graphene dispersion (see below).

The colloidal graphene oxide dispersion obtained by dispersing graphite oxide in water was optically clear to the naked eye and even in the light microscope at 1000 fold magnification, free of particles and had a pH of about 5. Using a laser, the resulting Tyndall effect showed that the graphite oxide resulted in a colloidal dispersion.

If such dispersion is diluted and then applied to a suitable sample holder, scanning force microscopy reveals that the colloidal dispersion consists of single layers of oxidized graphene, i.e. graphene oxide.

Example 2

Preparation of Blend

The two binders carboxymethylcellulose and stryrene butadiene were dissolved or dispersed in water, the active materials ($Li_{1.7}H_{0.6}V_3O_8$ and $LiFePO_4$ or $Li_{1.7}H_{0.6}V_3O_8$ and $LiCoO_2$) were added to the solution and the conductive additive (graphite and acetylene black) was added in the same way. The obtained slurry was knife-coated on an Aluminum current collector and 1.3 cm² discs were punch out after drying off the water. The obtained coins were pressed in order to reduce the volume by 30-40%.

Example 3

Testing

The comparison was done as follows. Pure samples were measured and the theoretical capacity of blends calculated for each cycle and then the measured capacity of the blends was compared with the calculated capacity as further described below.

Sample A: Capacity at first cycle=A1.
Sample B: Capacity at first cycle=B1.

Mixture of e.g. 50% A and 50% B without a synergetic effect would give 0.5 A1+0.5 B1 for the capacity. The increase or decrease compared to that capacity is presented below in Table 1 in percent gain (over 100%) or loss (below 100%) where 100% is the calculated value (no synergetic effect value, calculated with formula).

TABLE 1

$Li_xH_yV_3O_8$ lot A/LiFePO$_4$ (obtained from Aleees)

| Ratio | 100/0 | 75/25 | 50/50 | 25/75 | 0/100 |
|---|---|---|---|---|---|
| Calculated capacity (mAh/g) | — | 333 | 269 | 206 | — |
| Experimental capacity, 1st cycle (mAh/g) | 396 | 343 | 282 | 225 | 142 |
| Synergetic effect 1st cycle | 100 | 103 | 105 | 109 | 100 |
| Synergetic effect 2nd cycle | 100 | 101 | 103 | 105 | 100 |
| Synergetic effect 3rd cycle | 100 | 100 | 102 | 104 | 100 |
| Synergetic effect 4th cycle | 100 | 99 | 102 | 103 | 100 |
| Synergetic effect 5th cycle | 100 | 99 | 101 | 103 | 100 |
| Synergetic effect 20th cycle | 100 | 100 | 100 | 104 | 100 |

Figure 1:
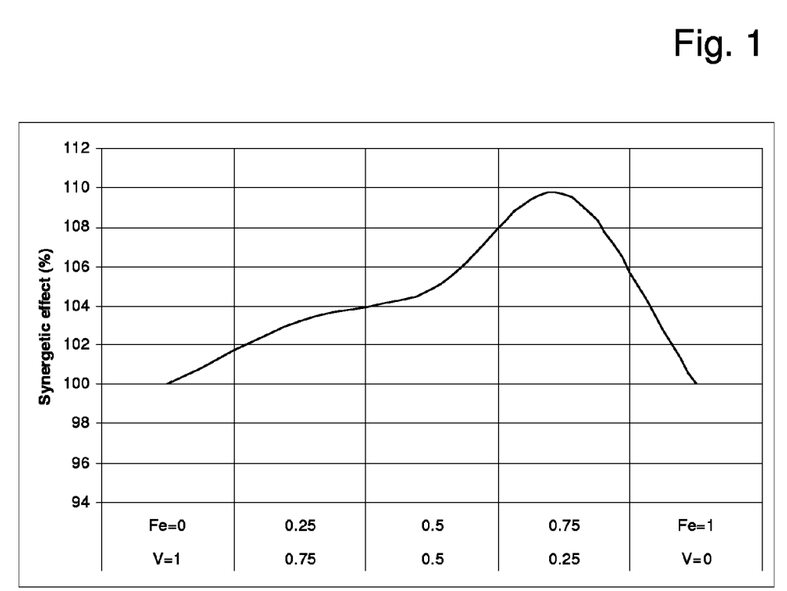
FIG. 1 shows a synergetic effect curve of a mixture of $Li_{1.7}H_{0.6}V_3O_8$ and $LiFePO_4$ in the first cycle.
Figure 3:
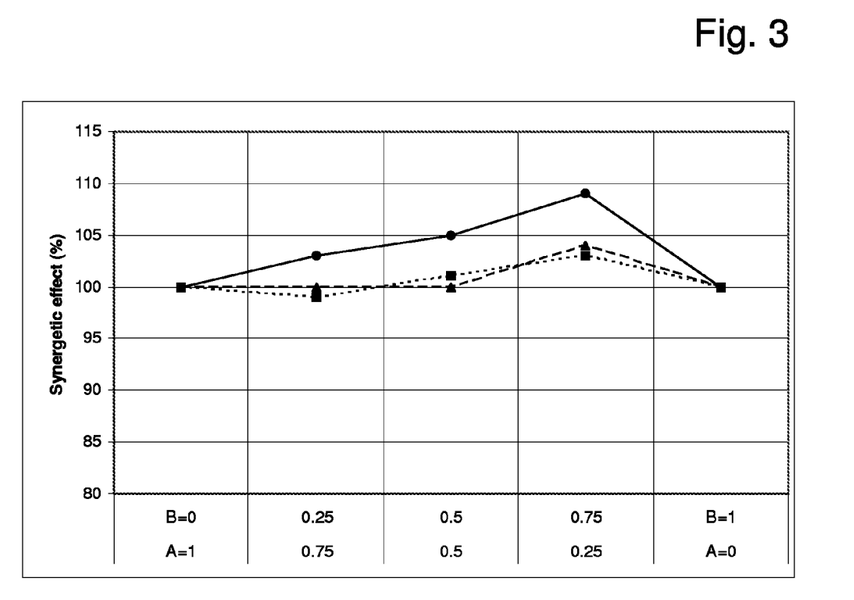
FIG. 3 shows the synergetic effect between $Li_{1.7}H_{0.6}V_3O_8$ lot A (A) and $LiFePO_4$ obtained from Aleees (B) for the 1st (round point), 5th (square point) and 20th (triangle point) cycle in percent vs. composition.
Figure 4:
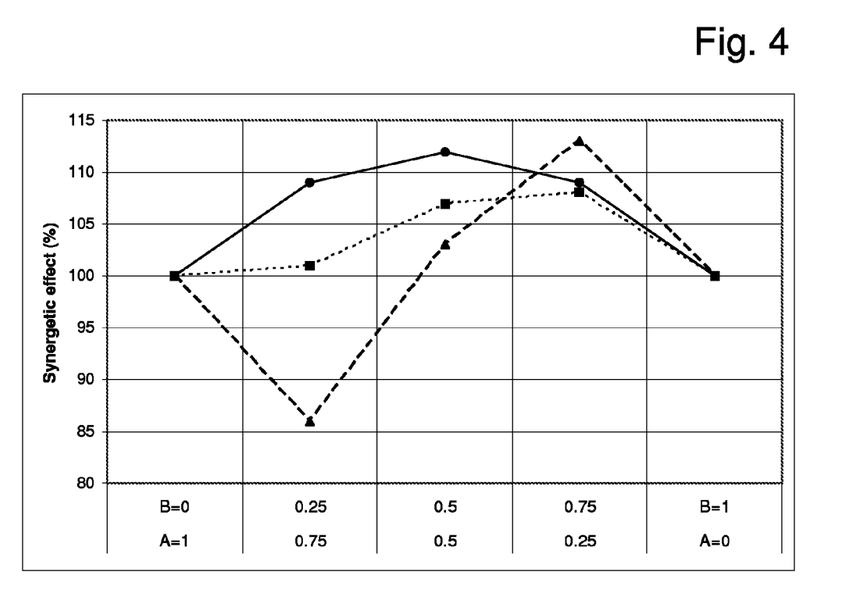
FIG. 4 shows the synergetic effect between $Li_{1.7}H_{0.6}V_3O_8$ lot B (A) and $LiFePO_4$ obtained from HydroQuebec (B) for the 1st (round point), 5th (square point) and 20th (triangle point) cycle in percent vs. composition.

A positive synergetic effect is found for all blends, however there is a maximum of a 9% increase in capacity for a blend of 25% $Li_xH_yV_3O_8$ and 75% LiFePO$_4$, i.e. a clear and significant beneficial synergetic effect for that composition. The results are illustrated in FIGS. 1 and 3.

To show that the effect is general and not limited to material from one company, LiFePO$_4$ from another company was examined in the same way. The results are listed in Table 2 below:

TABLE 2

$Li_xH_yV_3O_8$ lot B/LiFePO$_4$ (obtained from HydroQuebec)

| Ratio | 100/0 | 75/25 | 50/50 | 25/75 | 0/100 |
|---|---|---|---|---|---|
| Calculated capacity (mAh/g) | — | 287 | 243 | 200 | — |
| Experimental capacity, 1st cycle (mAh/g) | 330 | 314 | 272 | 217 | 156 |
| Synergetic effect 1st cycle | 100 | 109 | 112 | 109 | 100 |
| Synergetic effect 2nd cycle | 100 | 101 | 105 | 104 | 100 |
| Synergetic effect 3rd cycle | 100 | 102 | 107 | 106 | 100 |
| Synergetic effect 4th cycle | 100 | 101 | 108 | 107 | 100 |
| Synergetic effect 5th cycle | 100 | 101 | 107 | 108 | 100 |
| Synergetic effect 20th cycle | 100 | 86 | 103 | 113 | 100 |

The vanadium compound was not from the same lot as in the experiments shown in Table 1, explaining the difference in the capacity of pure compound. However, it could clearly be shown that the synergism is generally present.

Comparative Example

To show the importance of the presence of an oxygen comprising polyanion like phosphate, borate, sulfate, silicate, oxyphosphate, oxysulfate etc.) the same test was performed with a pure oxide, i.e. LiCoO$_2$. The results are listed in Table 3

TABLE 3

$Li_xH_yV_3O_8$ lot A/LiCoO$_2$ (obtained from Aldrich)

| Ratio | 100/0 | 75/25 | 50/50 | 25/75 | 0/100 |
|---|---|---|---|---|---|
| Calculated capacity (mAh/g) | — | 325 | 255 | 184 | — |
| Experimental capacity, 1st cycle (mAh/g) | 396 | 288 | 231 | 171 | 113 |
| Synergetic effect 1st cycle | 100 | 89 | 91 | 93 | 100 |
| Synergetic effect 2nd cycle | 100 | 86 | 81 | 93 | 100 |
| SSynergetic effect 3rd cycle | 100 | 85 | 78 | 89 | 100 |
| SSynergetic effect 4th cycle | 100 | 83 | 76 | 87 | 100 |
| SSynergetic effect 5th cycle | 100 | 83 | 75 | 85 | 100 |
| SSynergetic effect 20th cycle | 100 | 84 | 77 | 69 | 100 |

Figure 2:
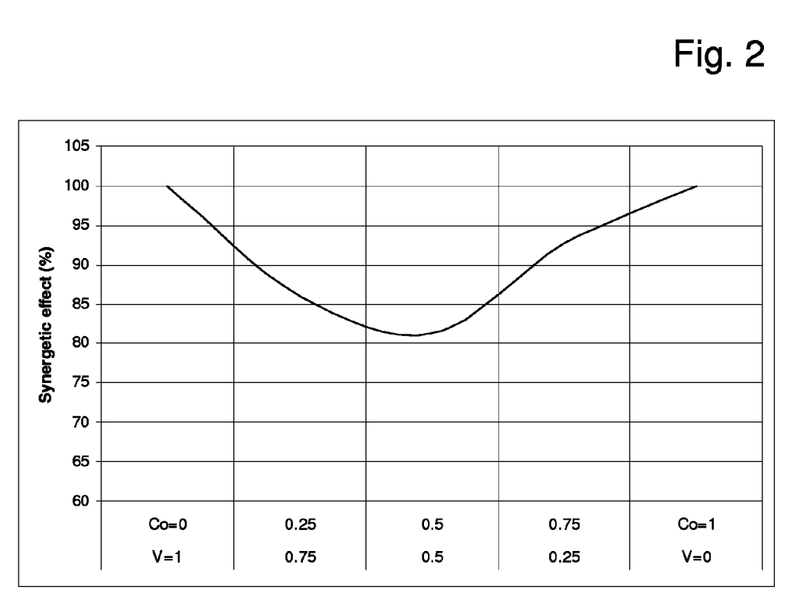
FIG. 2 shows a synergetic effect curve of a mixture of $Li_{1.7}H_{0.6}V_3O_8$ and $LiCoO_2$ in the first cycle.
Figure 5:
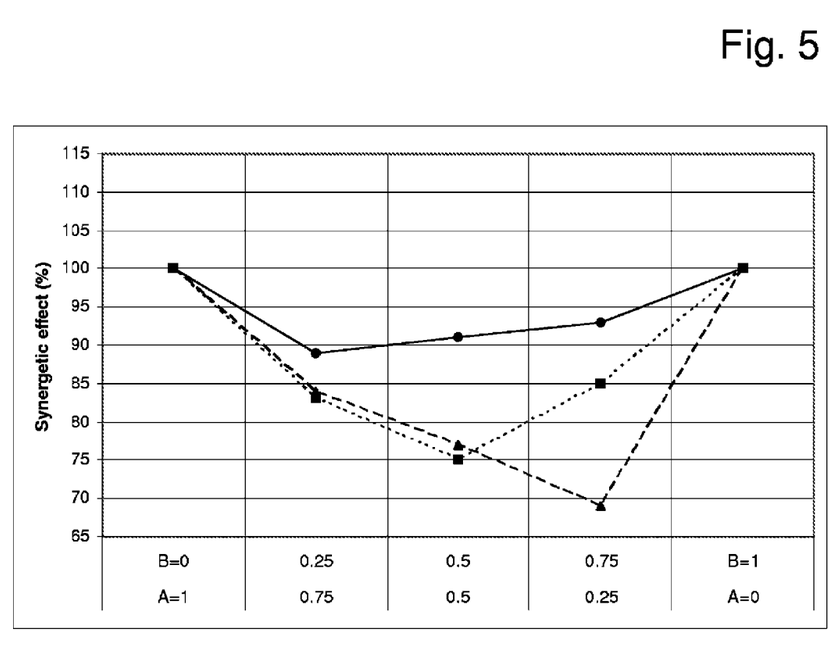
FIG. 5 shows the synergetic effect between $Li_{1.7}H_{0.6}V_3O_8$ lot A (A) and $LiCoO_2$ obtained from Aldrich(B) for the 1st (round point), 5th (square point) and 20th (triangle point) cycle in percent vs. composition.

Here a clear negative effect can be seen. The data for one cycle are presented in FIG. 2 and an illustration of the changes for three cycles (cycles 1, 5 and 20) is shown in FIG. 5.

CONCLUSION

The best composition range for mixtures of A=$Li_xH_yV_3O_8$ and B=other is A=5 to 50% by weight and B=95 to 50% by weight, preferably A=10 to 40% by weight and B=90 to 60% by weight.

The best positive effect was found for a mixture composed of around 25% by weight $Li_xH_yV_3O_8$+75% by weight LiFePO$_4$.

The importance of the presence of a molecular anion (polyanion) in the EAM to be combined with $Li_xH_yV_3O_8$ has been shown by comparison with a pure oxide type material. This finding was not expected at all. Without wanting to be bound by any theory, the inventor assumes that based on the results the synergistic effect might be due to an interaction between the polyanion like phosphate and the vanadium oxide surface.

While there are shown and described presently preferred embodiments of the invention, it is to be distinctly understood that the invention is not limited thereto but may be otherwise variously embodied and practiced within the scope of the following claims.

What is claimed is:

1. An electrochemically active material comprising a mixture or blend of two groups of particles, said groups having differing chemical compositions and being selected from
(a) at least one kind of particles of compounds of formula $$Li_xH_yV_3O_8 \quad (I),$$

wherein in formula (I):
x+y is >2 to 6.5,
x is 0.1 to 4.5; and
y is 0.01 to 2;
and
(b) at least one kind of particles of compounds of formula $$Li_xM_yPO_4 \quad (II),$$

wherein in formula (II):
x is >0 to 8;
M is one or more transition metals, comprising at least one metal which is capable of undergoing oxidation to a higher valence state;
y is 0.8 to 3;

PO$_4$ is trivalent,
and
said particles of formula (I) and said particles of formula (II) are present in amounts of 5:95% by weight to 95:5% by weight.

2. The electrode active material of claim 1, comprising as compound of formula (I) Li$_x$H$_y$V$_3$O$_8$, wherein x ranges from 0.1 to 2 and y ranges from 0.1 to 1.9.

3. The electrode active material of claim 1, comprising as compound of formula (II) Li$_x$M$_y$PO$_4$, wherein x ranges from >0 to 2.

4. The electrode active material claim 1, comprising as compound of formula (II) Li$_x$M$_y$PO$_4$, wherein y ranges from 0.8 to 1.2.

5. The electrode active material of claim 1, wherein M is one or more transition metals selected from the group consisting of Ti, V, Cr, Mn, Fe, Co, Ni, Co, Zr, Nb, Mo, Ru, Rh, and Pd.

6. The electrode active material of claim 1, wherein the compound of formula (II) is LiFe(PO$_4$).

7. The electrode active material of claim 1, wherein the mixture or blend comprises 5 to 50% by weight of compound of formula (I) and 95 to 50% by weight of compound of formula (II), the % by weight of compound of formula (I) and the % by weight of compound of formula (II) adding up to a total of 100%.

8. The electrode active material of claim 7, wherein the mixture or blend comprises 10 to 40% by weight of compound of formula (I) and 60 to 90% by weight of compound of formula (II).

9. The electrode active material of claim 8, comprising 25% Li$_x$H$_y$V$_3$O$_8$ and 75% LiFePO$_4$.

10. The electrode active material of claim 1, wherein the electrochemically active material is in the form of nanoparticles having an average diameter of <500 nm.

11. A cathode comprising a current collector coated with the electrochemically active material of claim 1 incorporated in a conducting matrix, wherein the matrix makes up for at most 10% by weight of the total weight of the coating.

12. A lithium battery comprising:
(a) the cathode of claim 11,
(b) an anode; and
(c) a non-aqueous electrolyte between said electrodes.

13. The lithium battery of claim 12, wherein said anode comprises a metal oxide, metal chalcogenide, carbon, graphite, and mixtures thereof.

14. The lithium battery of claim 13, wherein the anode is a carbon or graphite electrode.

15. The lithium battery of claim 12, wherein the electrolyte is stable towards catalytic decomposition.

16. The electrode active material of claim 2, wherein x in formula (I) ranges from 0.5 to 1.8.

17. The electrode active material of claim 3, wherein x in formula (II) ranges from >0 to 1.

18. The electrode active material claim 4, wherein y in formula (II) is 1.

19. The electrode active material of claim 5, wherein M is one or more transition metals selected from the group consisting of Fe, Co, Ni, V, Zr, Ti, Mo and Cr, in oxidation state 2 or 3.

20. The lithium battery of claim 12, wherein the anode is a lithium insertion anode.

* * * * *